_United States Patent Office_

3,022,330
Patented Feb. 20, 1962

3,022,330
NEUTRAL ESTERS OF BICYCLO HETEROCYCLIC PHOSPHORIC ACIDS
William M. Lanham, Charleston, W. Va., assignor to Union Carbide Corporation, a corporation of New York
No Drawing. Filed Aug. 21, 1956, Ser. No. 605,413
26 Claims. (Cl. 260—461)

This invention relates to the production of a novel class of neutral esters of bicyclo heterocyclic phosphoric acids and of thionophosphoric acids, and more especially it concerns novel esters having structures represented by the formula

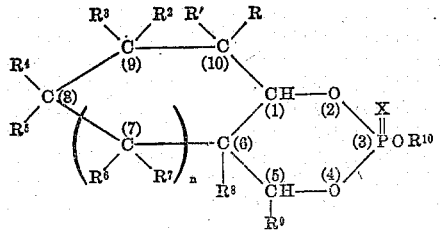

wherein each R and R' to $R^9$, respectively, designates a member of the class consisting of hydrogen and the alkyl radicals having 1 to 20 carbon atoms, and preferably those esters where R is hydrogen, R', $R^2$, $R^3$, $R^5$, $R^6$, $R^7$ and $R^8$, respectively, is hydrogen or an alkyl radical having 1 to 4 carbon atoms; and $R^4$ and $R^9$, respectively, is hydrogen or an alkyl radical having from 1 to 20 carbon atoms, such as the methyl, ethyl, isopropyl, hexyl, 2-ethylhexyl, decyl, tetradecyl and heptadecyl radicals; X designates oxygen or sulfur; $R^{10}$ is selected from the class consisting of the alkyl, cycloalkyl, haloalkyl, cyanoalkyl, aralkyl, alkoxyalkyl, alkoxyalkoxyalkyl, alkylmercaptoalkyl, alkylsulfinylalkyl, alkylsulfonylalkyl, alkenyl, cycloalkenyl, aryl, haloaryl, nitroaryl, and alkaryl radicals; and $n$ is 1 or 0.

Typical compounds of the invention are 2,4-dioxa-P-oxo - 3 - phosphabicyclo[4.3.0]nonanes and corresponding [4.4.0]decanes having directly connected with the P atom one of the following: an alkoxy group, such as the methoxy, butoxy, decyloxy and heptadecyloxy groups; a cycloalkoxy group, such as the cyclopentyloxy and cyclohexyloxy groups; a haloalkoxy group, such as the chloromethoxy, 2-chloroethoxy, 2-bromoethoxy and 2-chloropropoxy groups; a cyanoalkoxy group such as 2-cyanoethoxy and 2-cyanopropoxy groups; an aralkoxy group, such as benzyloxy; and alkoxyalkoxy or alkoxyalkoxyalkoxy group, such as the methoxyethoxy, butoxyethoxy, ethoxyethoxyethoxy, and butoxyethoxyethoxy groups; alkylmercaptoalkoxy, alkylsulfinylalkoxy and alkylsulfonylalkoxy groups, such as the 2-ethylmercaptoethoxy, 2-butylmercaptoethoxy, 2-ethylsulfinylethoxy, 2-hexylsulfinylethoxy, 2-ethylsulfonylethoxy and 2-decylsulfonylethoxy groups; an alkenoxy group, such as the 2-propenoxy, 2-methyl-2-propenoxy, and 2-butenoxy groups; a cycloalkenoxy group, such as the 2-cyclopentenoxy and 2-cyclohexenoxy groups; an aryloxy, haloaryloxy, nitroaryloxy or alkaryloxy group, such as the phenoxy, tolyloxy, xylyloxy, 2,4-dichlorophenoxy, o-bromophenoxy, and p-nitrophenoxy groups.

Other compounds of the invention correspond to the foregoing but have one or more of the carbon atoms in the cycloalkane ring substituted by one to two lower alkyl groups, such as the methyl, ethyl and butyl groups.

The novel compounds of the invention are effective insecticides, those having a phenyl or a substituted phenyl radical directly connected to the phosphorus atom being particularly effective, especially in the control of bean aphids and as the effective ingredient in housefly baits. The compounds also are useful plasticizers for resinous vinyl chloride-containing polymers, such as the polyvinyl chlorides, and copolymers of vinyl chloride with vinyl acetate or with other vinyl esters of lower fatty acids. For example, the compounds of Examples 2, 5, and 8 to 12 are effective plasticizers for resinous copolymers of vinyl chloride and vinyl acetate containing 96% of the chloride when fluxed for 5 minutes on a differential two-roll mill at 158° C. in the proportion of 64.5% of the resin, 35% of the said compound, and 0.5% of a commercial heat stabilizer for the resin. Those esters of the invention having an alkenoxy group directly attached to phosphorus can be converted to polymers by ethylenic polymerization thereof. They also are useful dyeing assistants for dyeing articles made from acrylonitrile-containing resins, and are effective flameproofing agents and petroleum additives.

The novel compounds of the invention can be prepared by a variety of processes. One preferred process involves reacting a heterocyclic bicyclo phosphorus chloride or bromide having the structure

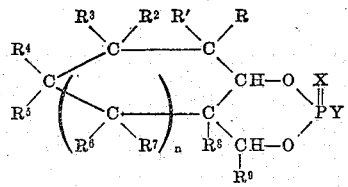

where R, R' to $R^9$, X and $n$ have the meanings previously indicated, and Y designates chlorine or bromine, with an agitated suspension or solution of an alkali metal hydroxide or carbonate in an excess of a monohydric aliphatic alcohol, phenol, or substituted alcohol or phenol, the excess of the alcohol or phenol acting as the reaction medium. The reaction proceeds in accordance with the illustrative equation:

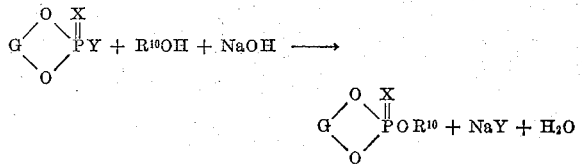

where G designates the hydrocarbon residue of a 2-(1-hydroxyalkyl)cycloalkanol, and X, Y and $R^{10}$ have the meanings indicated supra.

Among the alcohols and phenols useful as reactants may be mentioned methanol, ethanol, butanol, 2-ethylhexanol, decanol, tetradecanols, heptadecanols, cyclopentanol, cyclohexanol, chloromethanol, 2-chloroethanol, 2-chloropropanol, 2-bromoethanol, 2-hydroxyisobutyronitrile, 2-methoxyethanol, 2-ethoxyethanol, 2-butoxyethanol, 2-(2-ethoxyethoxy)ethanol, 2-(2-butoxyethoxy)ethanol, 2-ethylmercaptoethanol, 2-butylmercaptoethanol, 2-ethylsulfinylethanol, 2-hexylsulfinylethanol, 2-ethylsulfonylethanol, 2-decylsulfonylethanol, 2-propen-1-ol, 2-buten-1-ol, 3-penten-2-ol, 2-cyclopentenol, 2-cyclohexenol, phenol, cresols, xylenols, benzyl alcohol, 2,4-dichlorophenol, p-chlorophenol, o-bromophenol and p-nitrophenol. If desired, the alcohol or phenol can be employed in stoichiometric amount or in slight excess; and an inert solvent for the product, such as benzene can be employed as the reaction medium. While the alkali metal hydroxide or carbonate can be employed in stoichiometric quantity, it is preferred to use a 10% to 100% or more molar excess thereof. Since the by-product water has no deleterious effect, it is not necessary to use an anhydrous alkali metal hydroxide or carbonate. The reaction proceeds readily at temperatures in the range from around 5° C. to around 25° C., the preferred range, although temperatures of from −20° C. to +70° C. are operative. The desired compounds can be isolated as substantially pure residue products by removing the excess alcohol or phenol in vacuum, washing the resultant residue with water or a volatile solvent such as ethyl ether or benzene until neutral to litmus, and stripping the washed product by distillation under vacuum at temperatures at which water and any solvent are eliminated.

The novel compounds also can be prepared by the reaction of a heterocyclic bicyclo phosphorus chloride or bromide of the type hereinbefore described with an alcohol or phenol of the type R¹⁰OH, in the presence of a tertiary amine such as pyridine, triethylamine, N,N-dimethylaniline, and the like, according to the typical equation

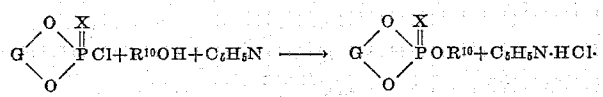

Usually a solution of the phosphorus halide in an inert solvent such as benzene is added slowly to an agitated solution of the alcohol or phenol and the amine in the inert solvent. However, this addition can be reversed with no deleterious effect. It is advantageous to use at least the stoichiometric amount of the alcohol or phenol, and usually an excess thereof is used. At least one mol of the tertiary amine is used per mol of the phosphorus-containing reactant. The resultant reaction mixture then is washed with an aqueous solution of an alkali metal carbonate or hydroxide, then washed with water, dried over calcium sulfate, and stripped by distillation under vacuum to remove the inert solvent.

The novel compounds wherein a phenoxy or substituted phenoxy group is directly attached to phosphorus also can be prepared by the slow addition of a phosphorus-containing compound of the type hereinbefore described, usually in solution in an inert solvent such as toluene or xylene, to an agitated suspension of the dry sodium salt of the phenolic compound at a temperature around 25° C. and upward. While benzene can be used as diluent, it is preferable to use one boiling above 100° C., since the reaction sometimes is completed more quickly at temperatures in the range from 100° C. to 150° C.

The reaction proceeds according to the equation:

While a catalyst such as a tertiary amine or copper powder can be employed, the use of a catalyst is not essential. The salts of the phenolic compounds can be used in the dry state or in the presence of water. A slight excess of the sodium salt often is preferred; or stoichiometric amounts of the reactants can be used. The novel products can be isolated as substantially pure residue products by neutralizing the reaction mixture, washing with water until neutral to litmus, drying with a drying agent or under vacuum, and stripping the solvent from the product by distillation under vacuum.

Other methods for making these compounds are illustrated in Examples 7 and 8.

The heterocyclic bicyclo phosphorus chlorides and bromides used as starting materials can be prepared by reacting a phosphoryl halide or a thiophosphoryl halide with a cycloalkane-1,3-diol, such as the 2-(1-hydroxyalkyl) cyclohexanols and cyclopentanols, and the corresponding 2-(1-hydroxyalkyl) cycloalkanols substituted on at least one carbon atom of the cycloalkanol ring with at least one alkyl radical having 1 to 20 carbon atoms. The phosphoryl halide can be added slowly to an agitated suspension or solution of the diol in an inert solvent for the product, such as benzene, maintained at around −20° C. to +60° C., preferably under around 500 mm. of mercury pressure, and using equimolar proportions of the reactants. In making the thiono-halide starting materials the cycloalkanediol can be added dropwise to equimolar amounts of the thiophosphonyl halide in benzene containing the theoretical two mols of a tertiary amine such as pyrodine for each mol of the diol, the reaction being conducted at a temperature in the range from 25° C. to around 60° C. The reaction mixture is washed with water and the washed residue is distilled under high vacuum for further purification, if desired.

A process for making the heterocyclic bicyclo phosphorus chlorides and bromides used as starting materials is described in my pending U.S. patent application, Serial No. 539,030, filed October 6, 1955, and involves reacting a phosphoryl halide or a thiophosphoryl halide with a disecondary cycloalkane-1,3-diol having a structure corresponding to the formula:

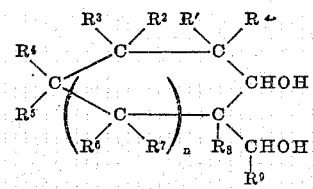

wherein R, R' to R⁹ and n have the meanings hereinbefore recited. Methods for making these cycloalkane-1,3-diols are described in Compt. rend., 207, 429–430; Compt. rend., 207, 475–477 (1938); and Chem. Abstracts, 33, 148 (1939). Still another method is described in U.S. Patent No. 2,356,683.

Among cycloalkanediols useful in making the starting materials for this invention may be mentioned.

2-hydroxymethylcyclohexanol
2-hydroxymethylcyclopentanol
2-(1-hydroxyethyl)cyclopentanol
2-(1-hydroxyethyl)-3-methylcyclopentanol
2-(1-hydroxypropyl)cyclopentanol
2-(1-hydroxypropyl)cyclohexanol
2-(1-hydroxyisobutyl)cyclohexanol
2-(1-hydroxyoctadecyl)cyclohexanol
2-(1-hydroxyethyl)-3,5,5-trimethylcyclohexanol
2-(1-hydroxyethyl)-3,3,5-trimethylcyclohexanol
2-(1-hydroxypropyl)-3,5,5-trimethylcyclohexanol
2-(1-hydroxypropyl)-3,3,5-trimethylcyclohexanol
2-(1-hydroxyisobutyl)-3,5,5-trimethylcyclohexanol
2-(1-hydroxyisobutyl)-3,3,5-trimethylcyclohexanol
2-(1-hydroxyoctadecyl)-3,5,5-trimethylcyclohexanol
2-(1-hydroxyoctadecyl)-3,3,5-trimethylcyclohexanol
2-(1-hydroxyethyl)-6-methylcyclohexanol
2-(1-hydroxyethyl)-2-methylcyclohexanol
2-(1-hydroxypropyl)-5-methylcyclohexanol
2-(1-hydroxypropyl)-3-methylcyclohexanol
2-(1-hydroxyisobutyl)-4-methylcyclohexanol
3,6-dimethyl-2-(1-hydroxyoctadecyl)cyclohexanol
2,5-dimethyl-2-(1-hydroxyoctadecyl)cyclohexanol
2-(1-hydroxyethyl)-4-tert-butylcyclohexanol The following examples serve to illustrate the invention:

*Example 1*

To an agitated solution of 13 grams (0.325 mol) of sodium hydroxide in 117 g. (3.65 mols) of methanol maintained at 10–15° C. there were added during 15 minutes dropwise a solution of 67 g. (0.3 mol) of P-chloro-2,4-dioxa-5-methyl-P-oxo-3-phosphabicyclo [4.4.0] decane in 25 g. of benzene. After an additional 30 minutes at 15° C., the reaction mixture stood overnight at 25° C. and was then stripped of excess methanol by distillation at a kettle temperature of 25° C. under less than 2 mm. of mercury. The residual product was diluted with 200 cc. of ethyl ether washed successively with dilute aqueous caustic soda and water until neutral to litmus, and then stripped by distillation at 100° C. under less than 2 mm. pressure. The resultant 2,4-dioxa-P-methoxy-5-methyl-P-oxo-3-phosphabicyclo [4.4.0] decane was recovered as a yellow liquid having the following properties: n 30/D=1.4718; acidity=0.02 cc. of normal base per gram. It had the following analysis in percent by weight: Cl=nil; P=13.58 (theory=14.06); C=48.98 (theory=49.07); H=7.91 (theory=7.78). It had the following structure:

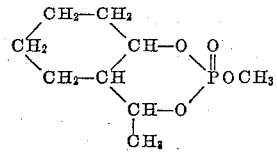

Example 2

To an agitated solution of 26 g. (0.65 mol) of sodium hydroxide in 110 g. (2.4 mols) of ethanol maintained at 10–15° C. there were added dropwise during 7 minutes a solution of 72 g. (0.3 mol) of P-chloro-2,4-dioxa-5-methyl-P-thiono-3-phosphabicyclo[4.4.0]decane in 50 cc. of benzene. Thereafter, the reaction mixture was stripped by distillation to a kettle temperature of 25° C. under less than 2 mm. of mercury. The mushy residue was diluted with 100 cc. of benzene, washed with water until neutral to litmus, dried over calcium sulfate, and stripped by distillation to a kettle temperature of 100° C. under less than 1.5 mm. of mercury. The residual 2,4-dioxa-P-ethoxy-5-methyl-P-thiono-3-phosphabicyclo[4.4.0]decane was a light yellow liquid having the following properties: n 30/D=1.5065; acidity =0.009 cc. of normal KOH per gram. It had the following analysis, in percent by weight: P=12.40 (theory=12.37); S=12.70 (theory=12.80); C=48.27 (theory=47.97); H=7.89 (theory=7.65). This compound was an effective plasticizer for a copolymer of vinyl chloride and vinyl acetate containing 96% of the chloride in the polymer upon fluxing on a differential two-roll mill at 158° C. for 5 minutes a mixture consisting of 64.5% of the resin, 35% of the above phosphorus compound, and 0.5% of dibutyl tin maleate as stabilizer.

Example 3

A solution of 74 g. (0.3 mol) of 2-ethylhexyl dichlorophosphate in 25 cc. of benzene was added dropwise during 15 minutes to an agitated solution of 43 g. (0.3 mol) of 2-(1-hydroxyethyl)cyclohexanol and 50 g. (0.63 mol) of pyridine in 250 cc. of benzene held at 25° C. After standing overnight at this temperature, the reaction mixture was filtered, and the filtrate was subsequently washed successively with aqueous sodium hydroxide and with water until neutral toward litmus. It was then stripped by distillation to a kettle temperature of 100° C. under less than 2 mm. pressure, yielding 81 g. of 2,4-dioxa-P-(2-ethylhexyloxy)-5-methyl-P-oxo-3-phosphabicyclo[4.4.0] decane as a yellow liquid having the following properties: n 30/D=1.4671; acidity=0.03 cc. of normal KOH per gram. It had the following analysis in percent by weight: P=9.66 (theory=9.73); C=60.38 (theory=60.35); H=9.34 (theory=9.82); Cl=nil. A yield of 85%, based on the phosphorus containing reactant, was secured.

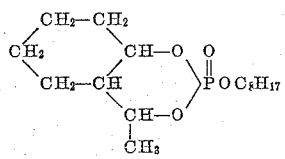

Example 4

To an agitated solution of 11 g. (0.275 mol) of sodium hydroxide in 60 g. (1.87 mols) of methanol held at 25° C. there were added dropwise during 8 minutes a solution of 56.5 g. (0.25 mol) of P-chloro-2,4-dioxa-5-methyl-P-thiono-3-phosphabicyclo[4.3.0]nonane in 25 g. of benzene. After agitating for 2 hours and standing for 64 hours at 25° C., the reaction mixture was filtered and the filtrate was stripped by distillation at 25° C. under less than 2 mm. pressure, the residue washed with 100 cc. of water, dried over calcium sulfate, filtered, and stripped by distillation at 50° C. under less than 2 mm. pressure. The residual 2,4-dioxa-P-methoxy-5-methyl-P-thiono-3-phosphabicyclo[4.3.0]nonane is a colorless liquid having the following properties: n 30/D=1.5063; acidity=0.006 cc. of normal KOH per gram. It had the following analysis in percent by weight: P=13.57; C=43.71; H=6.80; S=13.47; percent yield (based on the phosphorus-containing reactant)=74.

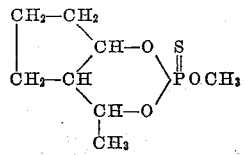

Example 5

To an agitated suspension of 0.325 mol of powdered sodium hydroxide and 0.5 mol of methoxyethanol and 100 g. of benzene held at 10–15° C., there were added during 20 minutes dropwise a solution of 0.3 mol of the phosphorus-containing reactant recited in Example 1 in 25 g. of benzene. After standing overnight at 25° C., the reaction mixture was filtered and 2 g. of powdered sodium hydroxide was added to the fitrate and the mixture allowed to stand at 25° C. for about 64 hours. It was again filtered and the filtrate was washed with water until neutral to litmus, and it was then stripped by distillation at 100° C. under less than 2 mm. of mercury, yielding 2,4-dioxa-P-(2-methoxyethoxy)-5-methyl-P-oxo-3-phosphabicyclo-[4.4.0]decane, as a yellow liquid residue having the following properties: n 30/D=1.4717; acidity=0.009 cc. of normal KOH per gram; it had the following analysis, in percent by weight: P=11.19; C=50.47; H=7.83. It was a compatible plasticizer for a resinous copolymer of vinyl chloride and vinyl acetate containing 96% of the vinyl chloride in the polymer at a concentration of 35% of the plasticized composition.

Example 6

During 15 minutes, a solution of 0.3 mol of the phosphorus-containing reactant of Example 2 in 25 g. of benzene was added dropwise to an agitated suspension of 0.325 mol of powdered sodium hydroxide in 0.5 mol of methoxyethoxyethanol and 100 g. of benzene maintained at 25° C. After standing overnight at 25° C., it was filtered, the filtrate was stripped by distillation at 75° C., under less than 2 mm. pressure, the residue diluted with ethyl ether, washed successively with concentrated aqueous sodium bicarbonate and with water, and stripped by distillation at 100° C. under less than 2 mm. mercury. The resultant 2,4-dioxa-P-(2-(2-methoxyethoxy)ethoxy)-5-methyl-P-thiono-3-phosphabicyclo-[4.4.0]decane was a brown liquid residue having the following properties: n 30/D=1.5047; acidity=0.02 cc. of normal KOH per gram; and the following analysis in percent by weight: P=9.55; S=9.80; C=48.70; H=7.62; percent yield (based upon the phosphorus-containing reactant)=75.

Example 7

To a refluxing solution of 0.3 mol of the phosphorus-containing reactant described in Example 2 in 200 g. of benzene, there were added dropwise during 30 minutes a solution of 0.6 mol of sodium hydroxide in 30 g. of distilled water. After refluxing the reaction mixture for 6 hours, 36 cc. of water were removed azeotropically, there were added to the residual suspension of sodium salts in benzene dropwise 0.35 mol of freshly prepared 2-cyclopentenyl chloride at a kettle temperature of 70° C. during 15 minutes. After heating an additional 4 hours at 70° C. and standing overnight at 25° C. the mixture was neutralized with aqueous sodium bicarbonate, washed with water until neutral to litmus, dried over calcium sulfate, and filtered. The filtrate was stripped by distillation at 80° C. under less than 22 mm. of mercury, yielding 54 g. of P-(2-cyclopentenoxy)-2,4-dioxa-5-methyl-P-thiono-3-phosphabicyclo[4.4.0]decane as a red viscous liquid residue having the following properties: n 30/D=1.5356; acidity=0.08 cc. of normal KOH per gram; and the following analysis in percent by weight: P=10.37 (theory=10.74); S=11.40 (theory=11.12); C=53.76 (theory=54.18) H=7.51 (theory=7.34).

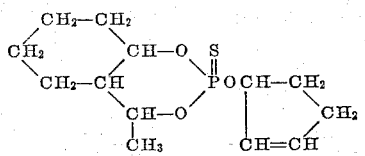

This compound is an effective plasticizer for a vinyl chloride-vinyl acetate copolymer resin containing 96% of the chloride in the polymer milled with the resin at 158° C. for 5 minutes in the weight ratio of around 65 of the resin to 35 of the said compound.

*Example 8*

Ethylene oxide was diffused into a solution of 0.3 mol of P-chloro-2,4-dioxa-5-methyl-P-oxo-3-phosphabicyclo-[4.4.0]decane, 150 g. of benzene and 5 g. of titanium tetrachloride held at 70° C. until the reaction temperature had dropped to 55° C. After refluxing the mixture for 45 minutes, it was stripped by distillation at 50° C. under less than 2 mm. of mercury. A net weight gain of 14 grams was obtained. The residue was neutralized with aqueous trisodium citrate, washed with water, dried over calcium sulfate, and filtered. The filtrate was stripped by distillation at 50° C. under less than 2 mm. of mercury, leaving 61.5 g. of P-(2-chloroethoxy)-2,4-dioxa-5-methyl-P-oxo-3-phosphabicyclo[4.4.0]decane as a yellow liquid residue having the following properties: n 30/D=1.4849; acidity=0.13 cc. of normal KOH per gram; it had the following analysis in percent by weight: P=11.31; C=43.73; H=6.77; Cl=12.11; percent yield (based on the phosphorus-containing reactant)=77.

*Example 9*

To a solution of 0.303 mol of phenol in 400 cc. of benzene was added dropwise a solution of 0.305 mol of sodium hydroxide in 15 g. of water during 5 minutes and at a kettle temperature of 25° C.–30° C. The reaction mixture was refluxed for 6.25 hours with the removal of 20 cc. of water azeotropically. To the resultant reaction mixture at 25° C. was added dropwise a solution of 0.3 mol of the phosphorus-containing reactant recited in Example 1 and 25 g. of benzene during 17 minutes. After standing overnight at 25° C. the reaction mixture was neutralized with aqueous sodium hydroxide, washed with water until neutral to litmus, and stripped by distillation at 50° C. under less than 2 mm. of mercury. The residual 2,4-dioxa-5-methyl-P-oxo-P-phenoxy-3-phosphabicyclo-[4.4.0]decane was secured as 73 g. of a colorless liquid having the following properties: n 30/D=1.5202; acidity=0.07 cc. of normal KOH per gram; and the following analysis in percent by weight: P=11.00; C=58.73; H=6.99; Cl=nil; percent yield (based on the phosphorus-containing reactant)=86.

This compound is an effective plasticizer for a resinous copolymer of vinyl chloride and vinyl acetate containing 96% of the chloride in the polymer, when milled with the resin at 158° C. for 5 minutes in the weight ratios of about 65:35 resin to plasticizer.

*Example 10*

A solution of 0.294 mol of the phosphorus-containing reactant recited in Example 1 and 25 g. of xylene was added dropwise during 20 minutes to an agitated suspension of 0.294 mol of the anhydrous sodium salt of 2,4-dichlorophenol in 400 g. of xylene and 1 g. of triethylamine maintained at 25° C. The reaction mixture was heated to 80° C. during 1 hour and thereafter was cooled to 25° C., neutralized with aqueous sodium bicarbonate, washed with water till neutral to litmus, dried over calcium sulfate, and stripped by distillation at 100° C. under 2 mm. of mercury. The resultant 2,4-dioxa-P-(2,4-dichlorophenoxy)-5-methyl-P-oxo-3-phosphabicyclo [4.4.0]decane was secured as a yellow viscous liquid residue having the following properties: n 30/D=1.5389; acidity=0.01 cc. of normal KOH per g.; and the following analysis in percent by weight: P=8.60; percent Cl=20.05; C=47.91; H=4.98; percent yield (based upon the phosphorus-containing reactant)=74.

*Example 11*

To an agitated suspension of 0.288 mol of the dry sodium salt of p-nitrophenol in 400 g. of xylene and 1 g. of triethylamine held at 25° C. there were added dropwise during 15 minutes a solution of 0.288 mol of the phosphorus-containing reactant of Example 1 in 25 g. of xylene. The reaction mixture was then heated for 2 hours at 100° C.–110° C., neutralized with aqueous sodium bicarbonate, washed with water till neutral to litmus, dried over calcium sulfate and filtered. The filtrate was stripped by distillation at 100° C. under 2 mm. of mercury, yielding 75 g. of 2,4-dioxa-5-methyl-P-(p-nitrophenoxy)-P-oxo-3-phosphabicyclo[4.4.0]decane as a yellow viscous liquid residue having the following properties: n 30/D=1.5403; acidity=0.02 cc. of normal KOH/g.; and the following analysis in percent by weight: P=9.44; C=50.02; H=5.70; N=3.97; percent yield (based on the phosphorus-containing reactant)=80.

*Example 12*

A solution of 0.4 mol of acetone cyanohydrin in 0.3 mol of pyridine was added dropwise during 15 mintues to an agitated solution of 0.3 mol of the phosphorus-containing reactant recited in Example 1 in 200 g. of benzene held at 25° C.–30° C. After standing about 42 hours at 25° C., 0.3 mol of powdered sodium hydroxide was added to the mixture held at 15° C. and the resultant mixture was then held at 25° C. for 90 hours, then washed with aqueous sodium bicarbonate and then with water until free from chloride ion, dried over calcium sulfate, filtered, and stripped by distillation at 100° C. under less than 2 mm. of mercury. The resultant P-(2-cyano-2-propoxy)-2,4-dioxa-5-methyl-P-oxo-3-phosphabicyclo [4.4.0]decane was recovered as 51 g. of a brown viscous liquid residue having the following properties: n 30/D=1.4748; acidity=0.006 cc. of normal KOH/g.; and the following analysis in percent by weight: P=11.34; C=51.53; H=7.48; Cl=nil; N=4.04.

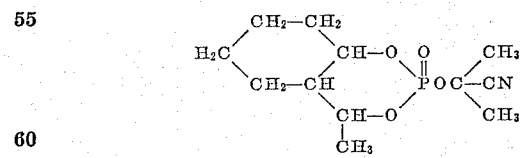

*Example 13*

A solution in 25 g. of benzene of 0.2 mol of P-chloro-2,4-dioxa-5,7,7,9-tetramethyl-P-thiono-3-phosphabicyclo [4.4.0]decane and/or P-chloro-2,4-dioxa-5,7,9,9-tetramethyl-P-thiono-3-phosphabicyclo[4.4.0]decane was added dropwise to an agitated solution of 0.25 mol of sodium hydroxide in 3.0 mols of methanol held at 25° C. during 10 minutes and after an additional 1.5 hours at 25° C. the reaction mixture was stripped by distillation at 25° C. under less than 2 mm. of mercury, and the residue dissolved in 150 cc. of ethyl ether, washed with water till neutral to litmus, and stripped by distillation at 100° C. under less than 2 mm. of mercury. The resultant product, 2,4-dioxa-P-methoxy-5,7,7,9 - tetramethyl-P-thiono-3-phosphabicyclo[4.4.0]decane and/or 2,4-dioxa-P-methoxy - 5,7,9,9-tetramethyl-P-thiono - 3 - phosphabicyclo[4.4.0]decane was secured as 41 g. of a clear yellow liquid residue having an n 30/D=1.5010; and an acidity of 0.02 cc. of normal KOH/g. It analyzed in percent by weight: P=10.48; S=10.68.

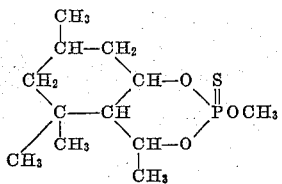

and/or

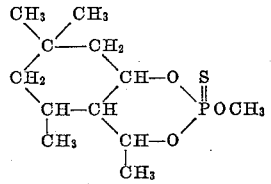

Example 14

To an agitated solution of 0.26 mol of allyl alcohol and 0.25 mol of pyridine in 75 g. of benzene held at 25° C. there were added during 8 minutes dropwise a solution of 0.2 mol of the phosphorus-containing reactant recited in Example 1 in 25 g. of benzene. After holding the reaction mixture for 18 hours at this temperature, the mixture was filtered and, after standing for 4 days at 25° C., was again filtered. The final filtrate was washed with aqueous sodium hydroxide and then with water, and was then stripped by distillation at 100° C. under less than 2 mm. of mercury. The residual 2,4-dioxa-5-methyl-P-oxo-P-(2-propenoxy) - 3 - phosphabicyclo[4.4.0]decane was obtained as a brown liquid having the following properties: n 30/D=1.4840; acidity=0.03 cc. of normal KOH/g. It had the following analysis, in percent by weight: P=12.56; C=52.49; H=7.50; Cl=nil.

Example 15

To an agitated solution of 0.4 mol of 2-ethyl-sulfonylethanol and 0.3 mol of pyridine in 200 g. of ethylene dichloride held at 25° C., there was added dropwise during 10 minutes a solution of 0.3 mol of the phosphorus-containing reactant of Example 1 and 25 g. of ethylene dichloride. After agitating the reaction mixture at 25° C. during about 30 hours, it was washed with aqueous sodium bicarbonate, and then dried over calcium sulfate, filtered, and the filtrate stripped by distillation at 50° C. under less than 1.1 mm. of mercury. The residual viscous brown liquid, 2,4 - dioxa - P - (2 - ethylsulfonylethoxy) - 5-methyl-P-oxo-3-phosphabicyclo[4.4.0]decane, had an acidity of 0.09 cc. of normal KOH/g. and the following analysis, in percent by weight: P=9.61; C=44.54; H=7.00.

Example 16

A solution of 0.3 mol of the phosphorus-containing reactant recited in Example 2 in 25 cc. of benzene was added dropwise during 20 minutes to an agitated suspension of 0.33 mol of powdered sodium hydroxide in 0.4 mol of 2-ethylmercaptoethanol and 200 g. of benzene held at 10–15° C. The mixture was stirred at 25° C. for 2 hours, washed with water until neutral to litmus, dried over calcium sulfate and stripped by distillation at 100° C. under 1 mm. of mercury. There were thus obtained 74 g. of 2,4-dioxa-P-(2-ethylmercaptoethoxy)-5-methyl-P-thiono-3-phosphabicyclo[4.4.0]decane as a light yellow liquid residue having n 30/D=1.5280; acidity=0.03 cc. of normal KOH/g.; and the following analysis, in percent by weight: P=10.17; S=20.20; C=45.55;

H=7.45; % yield (based on the phosphorus-containing reactant)=80.

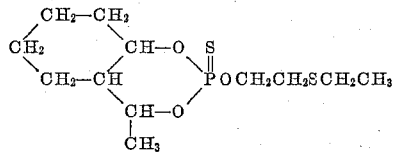

The utility of this novel class of compounds of the invention is illustrated by the 95–100% control of bean aphids on nasturtium plants secured by spraying the plants with aqueous solutions of the compounds of Examples 1, 6, 8, 9, 10 and 16 containing respectively, 0.60 g., 0.060 g., 0.032 g., 0.064 g., 0.060 g. and 0.026 g. of the said compounds per 100 cc. of solution.

The invention is susceptible of modification within the scope of the appended claims.

What is claimed is:

1. As new compounds, neutral esters of bicyclo heterocyclic phosporic acids and thionophosphoric acids, having structures designated by the formula

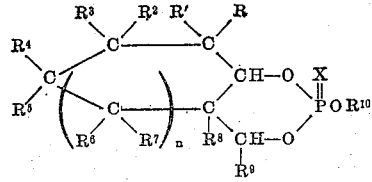

wherein R is hydrogen, R', $R^2$, $R^3$, $R^5$, $R^6$, $R^7$ and $R^8$, respectively, is of the class consisting of hydrogen and the lower alkyl radicals; $R^4$ and $R^9$, respectively, is of the class consisting of hydrogen and the alkyl radicals having from 1 to 20 carbon atoms; X represents a radical of the class consisting of oxygen and sulfur; and $R^{10}$ is a radical of the class consisting of the alkyl radicals having 1 to 17 carbon atoms, and the cyclopentyl, cyclohexyl, halo-lower alkyl, cyano-lower alkyl, benzyl, lower alkoxyethyl, lower alkoxyethoxyethyl, lower alkylmercaptoethyl, lower alkylsulfinylethyl, cyclohexenyl, phenyl, halophenyl, nitrophenyl and lower alkylphenyl radicals; and n is an integer of the class consisting of 0 and 1.

2. Neutral 2,4-dioxa-P-oxo - 3 - phosphabicyclo(4.4.0) decanes having an alkoxy radical containing 1 to 17 carbon atoms directly connected with the phosphorus atom.

3. Neutral 2,4-dioxa-P-oxo - 3 - phosphabicyclo(4.4.0) decanes having an alkoxy radical containing 1 to 17 carbon atoms directly connected with the phosphorus atom, and having an alkyl radical of from 1 to 20 carbon atoms attached to the carbon atom in the 5-position of said bicyclo compound.

4. Neutral 2,4-dioxa-P-oxo - 3 - phosphabicyclo(4.4.0) decanes having an alkoxy radical containing 1 to 17 carbon atoms directly connected with the phosphorus atom, having an alkyl radical of from 1 to 20 carbon atoms attached to the carbon atom in the 5-position of said bicyclo compound, and having at least one of the ring carbon atoms of the cyclic carbon ring substituted by 1 to 2 lower alkyl groups.

5. Neutral 2,4-dioxa-P-oxo - 3 - phosphabicyclo(4.4.0) decanes having an aromatic monocyclic hydrocarbyloxy radical having 6 to 8 carbon atoms directly connected with the phosphorus atom.

6. Neutral 2,4-dioxa-P-oxo - 3 - phosphabicyclo(4.4.0) decanes having a aromatic monocyclic hydrocarbyloxy radical having 6 to 8 carbon atoms directly connected with the phosphorus atom, and having an alkyl radical of from 1 to 20 carbon atoms attached to the carbon atom in the 5-position of said bicyclo compound.

7. Neutral 2,4-dioxa-P-oxo - 3 - phosphabicyclo(4.4.0) decanes having a aromatic monocyclic hydrocarbyloxy radical having 6 to 8 carbon atoms directly connected with the phosphorus atom, having an alkyl radical of from 1 to 20 carbon atoms attached to the carbon atom in the 5-position of said bicyclo compounds, and having at least one of the ring carbon atoms of the cyclic carbon ring substituted by 1 to 2 lower alkyl groups.

8. 2,4-dioxa-P-(2-ethylhexyloxy)-5-methyl - P - oxo - 3- phosphabicyclo(4.4.0) decane.

9. 2,4- dioxa-P-methoxy-5-methyl-P-oxo-3- phosphabicyclo(4.4.0)decane.

10. 2,4-dioxa-5-methyl-P-oxo-P-phenoxy - 3 - phosphabicyclo(4.4.0)decane.

11. Neutral 2,4-dioxa-P-oxo-3 - phosphabicyclo(4.4.0) decanes having a halo lower alkoxy radical directly connected with the phosphorus atom.

12. Neutral 2,4-dioxa-P-oxo-3 - phosphabicyclo(4.4.0) decanes having a halo lower alkoxy radical directly connected with the phosphorus atom, and having an alkyl radical of from 1 to 20 carbon atoms attached to the carbon atom in the 5-position of said bicyclo compound.

13. Neutral 2,4-dioxa-P-oxo-3 - phosphabicyclo(4.4.0) decanes having a halo lower alkoxy radical directly connected with the phosphorus atom, having an alkyl radical of from 1 to 20 carbon atoms attached to the carbon atom in the 5-position of said bicyclo compound, and having at least one of the ring carbon atoms of the cyclic carbon ring substituted by 1 to 2 lower alkyl groups.

14. P - (2-chloroethoxy - 2,4 - dioxa-5-methyl-P-oxo-3- phosphabicyclo(4.4.0)decane.

15. Neutral 2,4-dioxa-P-oxo-3 - phosphabicyclo(4.4.0) decanes having a lower alkenoxy radical directly connected with the phosphorus atom.

16. Neutral 2,4-dioxa-P-oxo-3 - phosphabicyclo(4.4.0) decanes having a lower alkenoxy radical directly connected with the phosphorus atom, and having an alkyl radical of from 1 to 20 carbon atoms attached to the carbon atom in the 5-position of said bicyclo compound.

17. Neutral 2,4-dioxa-P-oxo-3 - phosphabicyclo(4.4.0) decanes having a lower alkenoxy radical directly connected with the phosphorus atom, and having at least one of the ring carbon atoms of the cyclic carbon ring substituted by 1 to 2 lower alkyl groups.

18. 2,4- dioxa-5- methyl-P-oxo-P- (2-propenoxy)- 3- phosphabicyclo(4.4.0)decane.

19. Neutral 2,4 - dioxa - P - thiono - 3 - phosphabicyclo-(4.4.0)decanes having an alkoxy radical containing 1 to 17 carbon atoms directly connected with the phosphorus atom.

20. Neutral 2,4 - dioxa - P - thiono - 3 - phosphabicyclo-(4.4.0)decanes having an alkoxy radical containing 1 to 17 carbon atoms directly connected with the phosphorus atom, and having an alkyl radical of from 1 to 20 carbon atoms attached to the carbon atom in the 5-position of said bicyclo compound.

21. Neutral 2,4 - dioxa - P - thiono - 3 - phosphabicyclo-(4.4.0)decanes having an alkoxy radical containing 1 to 17 carbon atoms directly connected with the phosphorus atom, and having at least one of the ring carbon atoms of the cyclic carbon ring substituted by 1 to 2 lower alkyl groups.

22. 2,4 - dioxa - P - methoxy - 4,7,7,9 - tetramethyl - P- thiono-3-phosphabicyclo(4.4.0)decane.

23. 2,4 - dioxa - P - ethoxy - 5 - methyl - P - thiono - 3- phosphabicyclo(4.4.0)decane.

24. Neutral 2,4 - dioxa - P - thiono - 3 - phosphabicyclo (4.3.0)nonanes having an alkoxy radical containing 1 to 17 carbon atoms directly connected with the phosphorus atom.

25. Neutral 2,4 - dioxa - P - thiono - 3 - phosphabicyclo (4.3.0)nonanes having an alkoxy radical containing 1 to 17 carbon atoms directly connected with the phosphorus atom, and having an alkyl radical of from 1 to 20 carbon atoms attached to the carbon atom in the 5-position of said bicyclo compound.

26. Process for making a heterocyclic bicyclo phosphorus-containing ester, which comprises reacting a bicyclo hetero phosphorus-containing halide having the structure:

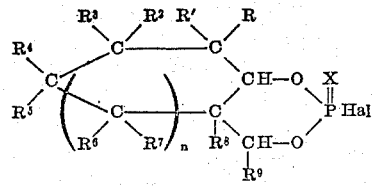

wherein R and R' to R⁹, respectively, designates a member of the class consisting of hydrogen and the alkyl radicals having 1 to 20 carbon atoms; X is selected from the class consisting of oxygen and sulfur; Hal is selected from the class consisting of chlorine and bromine; and $n$ is of the class consisting of 1 and 0; with (1) a monohydric hydroxy compound of the class consisting of the alkanols having from 1 to 17 carbon atoms, the lower alkenols, cyclopentanol, cyclohexanol, the halogen-substituted lower alkanols, the lower alkoxyethanols, the lower alkoxyethoxyethanols, the lower alkylmercaptoethanols, the lower alkylsulfinylethanols, the lower alkylsulfonylethanols, cyclopentenol, cyclohexenol, phenol, the lower alkyl-substituted phenols, the halogen-substituted phenols, the nitro-substituted phenols, and benzyl alcohol, and with (2) alkaline alkali metal compound of the class consisting of the alkali metal hydroxides and carbonates, at temperatures within the range between —20° C. and 70° C. in the ratio of at least one mol of the said hydroxy compound and at least one equivalent of the alkali metal compound per mol of said phosphorus-containing reactant, and recovering from the resultant reaction mixture an ester having the structure:

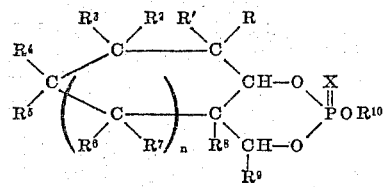

wherein R, R' to R⁹, X and $n$ have the aforesaid meanings, and OR¹⁰ designates the residue of the hydroxy compound used as reactant.

References Cited in the file of this patent
UNITED STATES PATENTS 2,506,344   Cleary _____ May 2, 1950
2,661,366   Gamrath et al. _____ Dec. 1, 1953

OTHER REFERENCES

Gault et al.: "Chem. Abst.," vol. 33, col. 147–8 (1939).
Arbuzov et al.; "Chem. Abst.," vol. 45, col. 1512–3 (1951).